US010003383B2

(12) United States Patent
Anzinger-Weitmann et al.

(10) Patent No.: US 10,003,383 B2
(45) Date of Patent: Jun. 19, 2018

(54) POWER TRANSMISSION SYSTEM

(71) Applicant: Fronius International GmbH, Pettenbach (AT)

(72) Inventors: Manfred Anzinger-Weitmann, Leonding (AT); Christian Fasthuber, Weis (AT); Helmut Friedl, Sipbachzell (AT)

(73) Assignee: Fronius International GmbH, Pettenbach (AT)

( * ) Notice: Subject to any disclaimer, the term of this patent is extended or adjusted under 35 U.S.C. 154(b) by 0 days. days.

(21) Appl. No.: 15/540,106

(22) PCT Filed: Dec. 29, 2015

(86) PCT No.: PCT/EP2015/081323
§ 371 (c)(1),
(2) Date: Jun. 27, 2017

(87) PCT Pub. No.: WO2016/107857
PCT Pub. Date: Jul. 7, 2016

(65) Prior Publication Data
US 2017/0353217 A1    Dec. 7, 2017

(30) Foreign Application Priority Data
Dec. 29, 2014 (AT) .................. A 934/2014

(51) Int. Cl.
*H05B 7/11*    (2006.01)
*H04B 3/54*    (2006.01)
(Continued)

(52) U.S. Cl.
CPC .......... *H04B 3/548* (2013.01); *B23K 9/1012* (2013.01); *H01F 27/28* (2013.01); *H02J 3/383* (2013.01)

(58) Field of Classification Search
CPC ....... H04B 3/548; H01F 27/28; B23K 9/1012; H02J 3/383
See application file for complete search history.

(56) References Cited

U.S. PATENT DOCUMENTS 3,815,054 A    6/1974 McClure et al.
9,012,807 B2 *  4/2015 Ott .................. B23K 9/095
                                          219/130.1
(Continued)

OTHER PUBLICATIONS

International Search Report corresponding to International Application No. PCT/EP2015/081323, dated Feb. 15, 2016 (12 pages).

*Primary Examiner* — Dac Ha
(74) *Attorney, Agent, or Firm* — Maginot, Moore & Beck, LLP

(57) ABSTRACT

Power transmission system (1) for power transmission of electric power (P) from a power source (2A) to a power sink (4A) which is connected to the power source (2A) via a power transfer cable (3), wherein the power source (2A) has a first pole with a first electric potential, which is connected via parallel current lines of a first conducting pair of the power transfer cable (3) to a first pole of the power sink (4A), and a second pole with a second electric potential, which is connected via further parallel current lines of a second conducting pair of the power transfer cable (3) to a second pole of the power sink (4A), wherein, during the power transmission via the current lines, a user data signal can be transmitted between the power source (2A) and the power sink (4A) via at least one conducting pair with current lines of the same electric potential, uninfluenced by the power transmission.

12 Claims, 5 Drawing Sheets

(51) Int. Cl.
 H01F 27/28 (2006.01)
 B23K 9/10 (2006.01)
 H02J 3/38 (2006.01)

(56) References Cited

U.S. PATENT DOCUMENTS

| | | | |
|---|---|---|---|
| 2005/0016975 A1* | 1/2005 | Reynolds | B23K 9/1087 |
| | | | 219/132 |
| 2008/0084937 A1 | 4/2008 | Barthold et al. | |
| 2016/0136746 A1* | 5/2016 | Denis | B23K 9/1087 |
| | | | 219/132 |

* cited by examiner

POWER TRANSMISSION SYSTEM

This application is a 35 U.S.C. 371 National Stage application of PCT/EP2015/081323, filed Dec. 29, 2015, and claims priority to Austrian Application No. A934/2014.1, filed on Dec. 29, 2014. The entire contents of the above-mentioned patent applications are incorporated herein by reference as part of the disclosure of this U.S. application.

The invention relates to a power transmission system, in particular a welding system, for power transmission of electric power from a power source to a power sink via a power transfer cable, wherein a user data signal can be transmitted during the power transfer, and to a method for user data transmission via a power transfer cable.

In many applications, electric power is transmitted from a power source to a power sink. A power source, e.g. a current source, generates electric power which is transmitted via a power transfer cable to a power sink, e.g. to an electric consumer. In an electric welding system, a welding device has a welding current source which supplies an electric welding current for a welding torch, wherein the welding current is transferred via current lines of a power transfer cable from the welding device to the welding torch.

WO 2012/058164 describes a welding system with a connection to obtain welding power from a welding current source via a cable, wherein a control signal connection is provided to exchange welding operating data with the welding current source via a signal cable. The welding system also has a wire feed connection which is provided to send welding power from the welding current source to a wire feed and to exchange welding operating control data with the wire feed via a wire feed cable. A communication circuit is arranged to combine the welding power of the welding current source and data from the current supply for the wire feed connection and to separate data from the wire feed connection for communication to the control signal connection.

US 2008/084937 A1 describes a current transmission system with an intra-bundle power line carrier system, wherein a first transmission path is provided through a plurality of conductors disposed in parallel and in a circle and which are disposed about one or a plurality of centrally disposed conductors via which a second transmission path is provided.

U.S. Pat. No. 3,815,054 A describes a frequency transmission line with a multiplicity of individual conductors of the same diameter, which are disposed in a ring about a central conductor.

U.S. Pat. No. 7,381,922 B2 discloses a welding system in which a data transmission between a wire feed unit and a current source of a welding device is effected via a welding cable. Data are transmitted in series via the welding cable. In such a conventional welding system, however, the data transmission does not take place during the transmission of the electric power, i.e. during welding, but rather during certain time intervals in which no electric welding current is transmitted to the welding torch via the cable. Therefore, this welding system has the disadvantage that during the welding process no data transmission can take place between the welding device and the welding torch, in particular the wire feed unit thereof. Consequently, in this conventional welding system, no welding parameters or the like can be adjusted at the welding torch during the welding process and the welding device also cannot receive any data relating to the welding process from the welding torch.

It is therefore an object of the present invention to provide a power transmission system for power transmission of electric power from a power source to a power sink in which during the power transmission a user data signal can be reliably transmitted between the power source and the power sink.

In accordance with the invention, this object is achieved by a power transmission system having the features stated in claim 1.

The invention accordingly provides a power transmission system for power transmission of electric power from a power source to a power sink which is connected to a power source via a power transfer cable, wherein the power source and the power sink each comprise a first pole with a first electric potential and a second pole with a second electric potential, wherein the poles are connected via parallel current lines of a first conducting pair and of a second conducting pair of the power transfer cable, wherein during the power transmission a user data signal can be transmitted between the power source and the power sink via at least one conducting pair with current lines of the same electric potential, uninfluenced by the power transmission.

The power transmission system in accordance with the invention offers the advantage that a user data signal can be transmitted during the power transfer via the same power transfer cable, uninfluenced by the power transmission between a power source and a power sink. In this way, a controller of a device which contains the power source—during the power transmission to another device which contains the power sink—can, during the power transmission, simultaneously transmit control data to the second device and furthermore simultaneously receive e.g. sensor data from the second device via the power transfer cable. This offers the advantage that process parameters, in particular parameters of a welding process can be transmitted curing the power transfer so that the quality of the welded product can be increased. At the same time, the controller of the welding device can receive e.g. sensor data during the welding process and therefore react quickly to changes during the welding process or in the welding environment. In this way, the quality of the product produced in the welding process can also be increased.

In one possible embodiment of the power transmission system in accordance with the invention, the device which contains the power source and the device which contains the power sink each comprise a user data modem, which is attached or can be connected to the current lines of a conducting pair of the power transfer cable, for transmission of the user data signal.

This user data modem is preferably provided to send and/or receive a user data signal in a preset user data frequency band.

In one possible embodiment, the user data frequency band for the user data signal transmitted via the current lines of the same electric potential is in a frequency range of 2 MHz to 30 MHz.

In one possible embodiment of the power transmission system in accordance with the invention, this user data frequency band is provided. In a further possible embodiment, the user data frequency band is divided into different frequency band ranges which can be selectively chosen for transmission of the user data signal during the power transfer.

In a further possible embodiment of the power transmission system in accordance with the invention, the first pole of the power source, which has a first electric potential, is connected via a first bifurcation point provided at a first end of the power transfer cable to a first current line of the power transfer cable and to a second current line of the power transfer cable which are both connected via a second bifurcation point provided at a second end of the power transfer cable to the first pole of the power sink, and wherein the second pole of the power source, which has a second electric potential, is connected via a third bifurcation point provided at the first end of the cable to a third current line of the power transfer cable and to a fourth current line of the power transfer cable which are both connected via a fourth bifurcation point provided at the second end of the power transfer cable to the second pole of the power sink.

A respective choke for decoupling purposes is provided at both ends of the power transfer cable.

The chokes provided at both ends of the power transfer cable are each current-compensated chokes.

In a further possible embodiment of the power transmission system in accordance with the invention, the current lines of the power transfer cable are arranged in such a way that they can transmit electric power of at least 1 KW.

In a further possible embodiment of the power transmission system in accordance with the invention, the power source is a welding current source of a welding device which, via the current lines of the power transfer cable, transmits a welding current to a welding torch as a power sink. Wire feed with attached welding torch—use continuously instead of welding torch [sic]

In a further possible embodiment of the power transmission system in accordance with the invention, a control unit is provided which is attached to a user data modem for transmission of a user data signal.

In a further possible alternative embodiment of the power transmission system in accordance with the invention, the power source has at least one connection component such as a rapid shutdown box, a string collector, a string controller etc. of a photovoltaic system which is connected to at least one photovoltaic module, and which transmits an electric direct current to a inverter of the photovoltaic system via the current lines of the power transfer cable.

In a further possible alternative embodiment of the power transmission system in accordance with the invention, the power source comprises a charging device which, via the current lines of the power transfer cable, transmits a charging current to a chargeable accumulator as a power sink.

The invention further provides, according to a further aspect, a method for transmitting a user data signal comprising the features stated in claim 11.

Consequently, the invention provides a method for transmitting a user data signal between a first device which comprises a power source and a second device which comprises a power sink, wherein the two devices are connected to one another via a power transfer cable for power transfer of electric power from the power source of the first device to the power sink of the second device, wherein the user data signal is transmitted via parallel current lines of the power transfer cable which comprise the same electric potential, uninfluenced by a power transfer which is carried out at the same time.

In one possible embodiment of the method in accordance with the invention, the user data signal is transmitted in a preset user data frequency band of 2 to 30 MHz.

In a further possible embodiment of the method in accordance with the invention, the user data signal is transmitted unidirectionally or bidirectionally, during the power transfer, via at least two parallel current lines of the power transfer cable, which have the same electric potential.

The invention further provides, according to a further aspect, a power transfer cable for transferring electric power comprising the features stated in claim 14.

Consequently, the invention provides a power transfer cable for transfer of electric power from a power source, in particular a welding current source, to a power sink, in particular a welding torch, wherein the power transfer cable has at least two conducting pairs each with two parallel current lines, wherein both parallel current lines of each conducting pair have the same electric potential during the power transfer and are galvanically connected to one another at both ends of the power transfer cable, wherein in the case of at least one conducting pair, at both ends of the power transfer cable, a respective user data connection for connection of a user data modem is provided which is suitable for sending and/or receiving a user data signal transmitted via the two current lines of the conducting pair.

Possible embodiments of the power transmission system in accordance with the invention and of the method in accordance with the invention for transmission of user data between a power source and a power sink are explained in more detail hereinunder with reference to the attached figures, in which.

Figure 1:
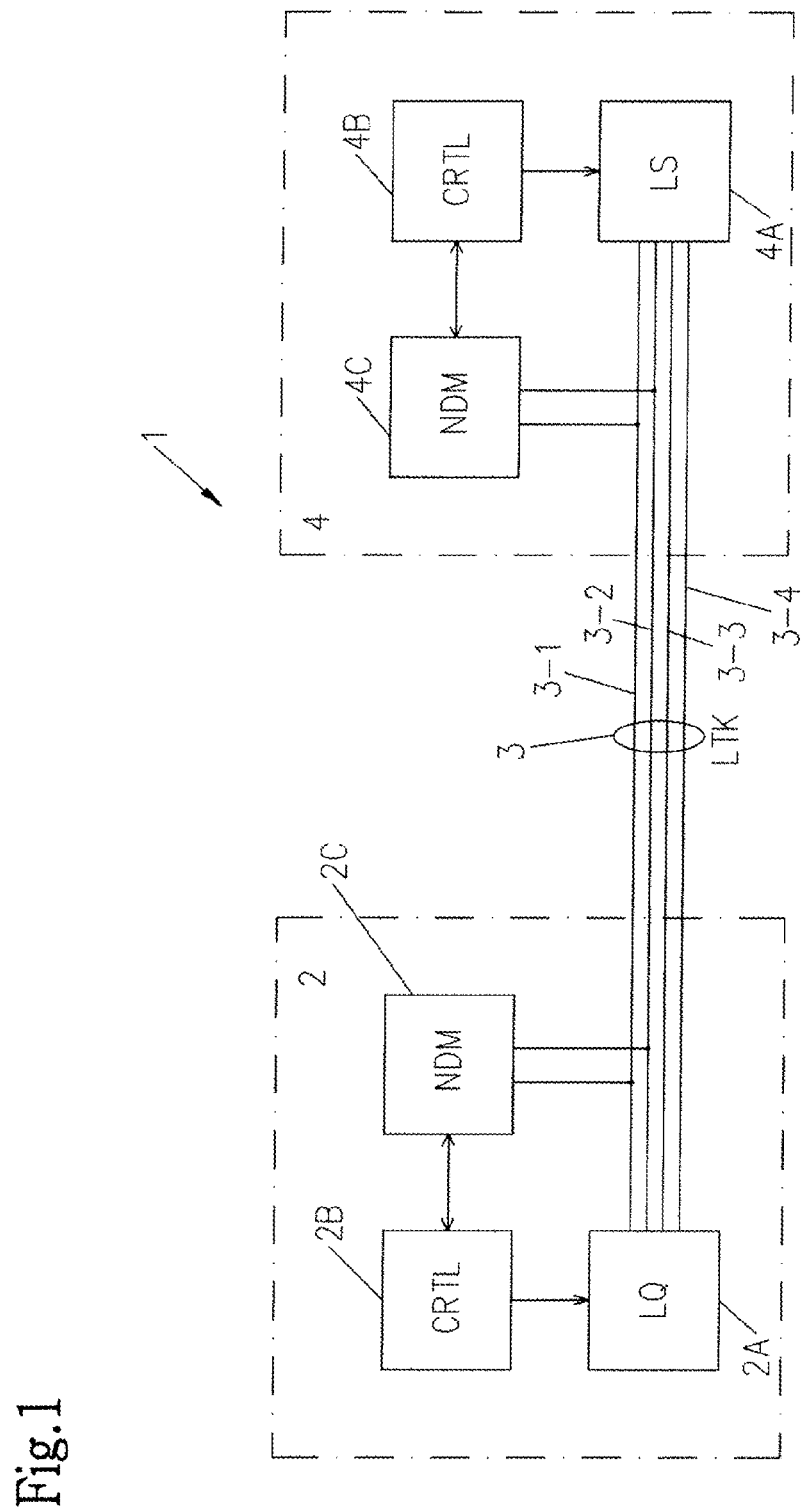
FIG. 1 is a block circuit diagram to illustrate an exemplified embodiment of a power transmission system in accordance with the invention.

As shown in FIG. 1, a power transmission system 1 for power transmission of electric power P in the illustrated exemplified embodiment includes a first device 2 with a power source 2A integrated therein, which is connected via a power transfer cable 3 to a power sink 4A within a second device 4 of the power transmission system 1. In one possible embodiment, the first device 2 is welding device which has a welding current source 2A as a power source LQ. This welding current source 2A transmits an electric welding current to a wire feed device 4A as a power sink LS. In order to carry out a welding process, a welding torch is connected to the wire feed device 4A. The wire feed device 4A preferably has a control unit 4B. The controller 4B of the second device 4 is connected to a user data modem 4C for sending and/or receiving a user data signal, as illustrated in FIG. 1. The first device 2, e.g. a welding device, likewise has an internal controller 2B which is connected to a user data modem 2C of the first device 2. The two user data modems 2C, 4C of the two devices 2, 4, which are connected to one another via the power transfer cable 3, can send or receive a user data signal in a preset user data frequency band. As indicated in FIG. 1, the power transfer cable (LTK) 3 of the power transmission system 1 in accordance with the invention has two conducting pairs each with two parallel current lines, i.e. it has a total of four current lines 3-1, 3-2, 3-3, 3-4. The first two current lines 3-1, 3-2 form a first conducting pair and the remaining two current lines 3-3, 3-4 form a second conducting pair. The power source 2A has a first electric pole with a first electric potential which is connected via the two parallel current lines 3-1, 3-2 of the first conducting pair within the power transfer cable 3 to a first pole of the remote power sink 4A of the second device 4. The power source 2A also has a second electric pole with a second electric potential which is connected via the two further parallel current lines 3-3, 3-4 of the second conducting pair within the power transfer cable 3 to a second pole of the remote power sink 4A. In the power transmission system 1, during the power transmission of the electric power P from the power source 2A to the power sink 4A, a user data signal can simultaneously be transmitted, with the aid of the two user data modems 2C, 4C, between the two devices 2, 4 via at least one conducting pair with current lines of the same electric potential, uninfluenced by the power transfer. The data transmission is thus substantially independent of the length of the power transmission system 1 which can even be several 10 m e.g. in shipbuilding.

In the case of the exemplified embodiment illustrated in FIG. 1, the user data signal is transmitted between the first and the second device 2, 4 via the current lines 3-1, 3-2 which are both at the first electric potential. By supplying the user data signal to poles of like potential, push-pull interference is avoided. In one possible embodiment, the transmission of user data takes place in a preset user data frequency band which is in a frequency range of 2 MHz to 30 MHz. In one possible embodiment, the user data frequency band is divided into underfrequency ranges which can be selectively chosen for user data transmission. In the exemplified embodiment illustrated in FIG. 1, the two user data modems 2C, 4C of both devices 2, 4 are fixedly connected to the two current lines 3-1, 3-2 of the first conducting pair within the power transfer cable 3. In a further possible embodiment of the power transmission system 1 in accordance with the invention, both user data modems 2C, 4C can be connected to the current lines 3-$i$ of the power transfer cable 3. The user data modems can be switched on and off via an internal controller 2B, 4B of the respective device 2, 4. In one possible embodiment of the power transmission system 1 in accordance with the invention, the transmission of the user data signal is effected unidirectionally from one device to the other device. In one alternative embodiment of the power transmission system 1 in accordance with the invention, the transmission of the user data signal can also be effected bidirectionally between the two devices 2, 4. The unidirectional or bidirectional transmission takes place in both cases via two parallel current lines of a conducting pair within the power transfer cable 3, which comprise the same electric potential. The data communication therefore takes place via two current lines of the same potential. In this way, interference in the transmitted data as a result of a simultaneously transmitted transporting current I, e.g. a welding current, is avoided.

In order that the user data signal is not shorted, a choke for decoupling purposes is preferably provided at both ends of the power transfer cable 3, as described in detail in conjunction with the following figures. This choke is preferably a current-compensated choke which does not have a detrimental effect on the processing property and which decouples the user data signal from the connection point. In one possible embodiment, a current-compensated choke with a ferrite core is provided at both ends of the power transfer cable 3, e.g. the chokes 5, 7 illustrated in FIG. 2. As shown in FIG. 3, 2 chokes (5-1/5-2 and 7-1/7-2) can also be disposed at each end respectively. In one possible embodiment, the ferrite core is a foldable ferrite core which is attached to the current lines similarly to a sleeve and surrounds same. In one possible embodiment, the attached ferrite core can be exchangeable. The coke is e.g. preferably arranged such that it carries out a current compensation for the current I, e.g. welding current, transporting the electric power P, whereas it does not bring about a current compensation for the user data signal. The choke therefore prevents shorting of the user data signal at a bifurcation point at which the two current lines of a conducting pair are galvanically connected to one another or are galvanically coupled to one another. Therefore, the following arrangement for the power transmission system 1 is provided: power source, choke, modem, power transfer cable, modem, choke, power sink. The throttle and modem can thus also be integrated in a corresponding manner in the power source LQ or power sink LS. The choke is preferably designed as a current-compensated choke so that the inductance for the implementation of the welding process is not too high or is kept low. In order to switch off the power or current source 2A, the inductance L of the choke is set sufficiently low so that, after completed switch-off of the current source, the welding process is terminated as quickly as possible at the welding torch. The curve-ascending and curve-descending times are correspondingly short so that the weld seam produced in the welding process is of a high quality. In one possible embodiment, the user data are transmitted in an encoded and/or encrypted manner. In both devices 2, 4, a respective encoding/decoding unit and/or an encryption/decryption unit is provided.

The current lines 3-$i$ of the power transfer cable 3 are preferably arranged in such a way that they can transmit electric power P of at least 1 KW from the power source 2A to the power sink 4A.

Figure 2:
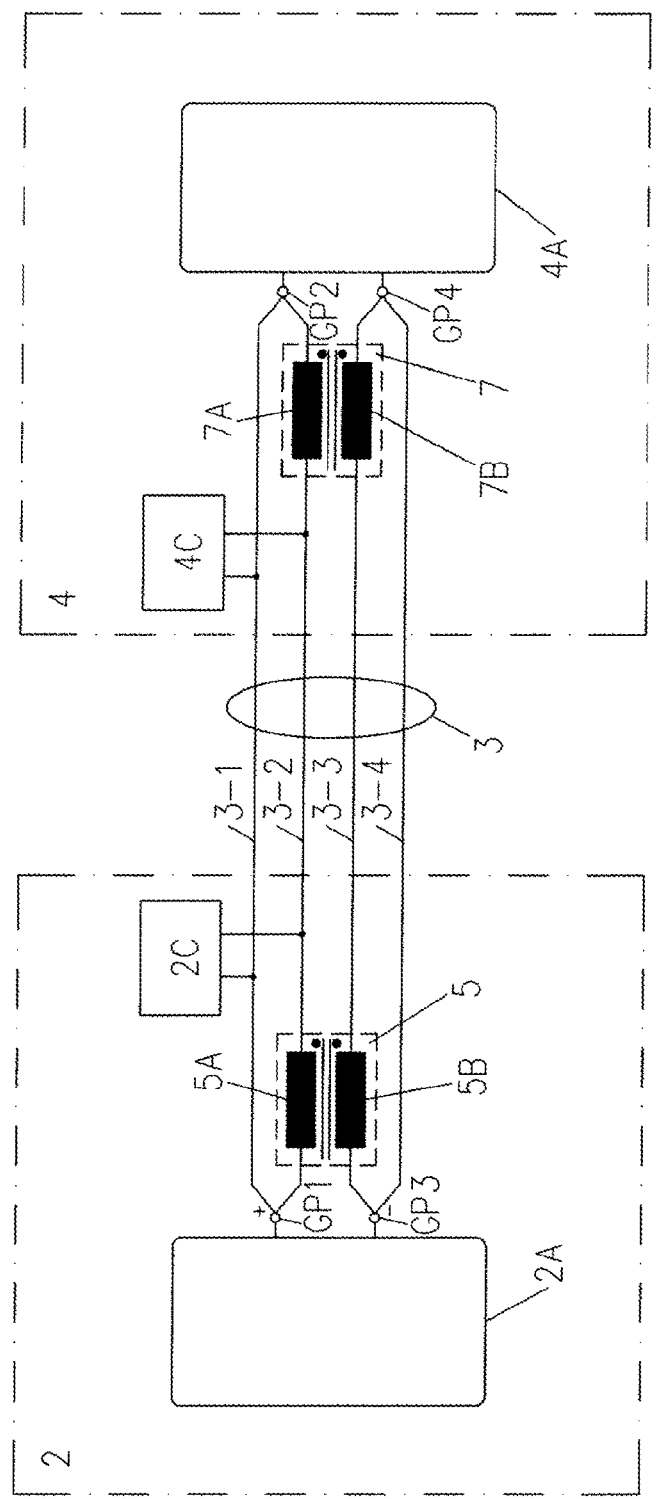
FIG. 2 is a circuit diagram to illustrate an exemplified embodiment of the power transmission system in accordance with the invention.
Figure 3:
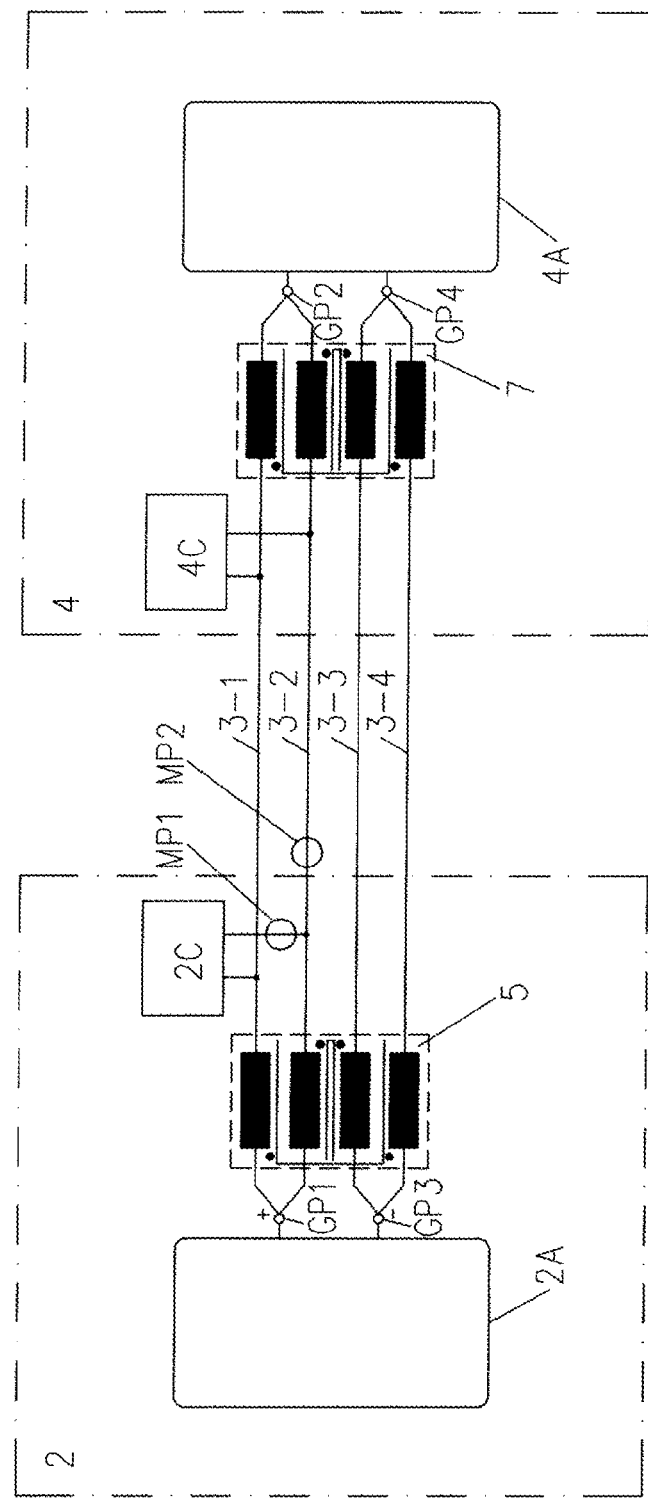
FIG. 3 is a further circuit diagram to illustrate a further exemplified embodiment of a power transmission system in accordance with the invention.

FIG. 2 shows an exemplified embodiment of the power transmission system 1 in accordance with the invention, having a welding device 2 which has a welding current source 2A which is connected to a wire feed unit via a power transfer cable 3 comprising current lines. The power source 2A of the welding device 2 has a first pole (+) with a first electric potential, which is connected to a first pole (+) of the power sink 4A via two parallel current lines 3-1, 3-2 of a first conducting pair of the power transfer cable 3, and has a second pole (−) which has a second electric potential, which is connected to a second pole (−) of the power sink 4A via two further parallel current lines 3-3, 3-4 of a second conducting pair within the power transfer cable 3. As shown in FIG. 2, the two current lines 3-1, 3-2 of the first conducting pair, which are at the positive electric potential (+), have a user data modem 2C, 4C connected to them on both sides, which serve to transmit the user data signal. The first pole (+) of the power source or welding current source 2A, which has a first electric potential, is connected via a first bifurcation point GP1 provided at a first end of the power transfer cable 3 to the first current line 3-1 of the power transfer cable 3 and to the second current line 3-2 of the power transfer cable 3.

These two current lines 3-1, 3-2 are connected via a second bifurcation point GP2 provided at a second end of the power transfer cable 3 to the first positive pole (+) of the power sink 4A, as illustrated in FIG. 2. In the same way, the second negative pole (−) of the power source or of the welding current source 2A, which has a second negative electric potential (−) is galvanically connected via a third bifurcation point GP3 provided at the first end of the power transfer cable 3 to the third current line 3-3 and to the fourth current line 3-4 of the power transfer cable 3, which are both connected via a fourth bifurcation point GP4 provided at the second end of the power transfer cable 3 to the second negative pole of the power sink 4A. Double the load cable potential is carried so that the supply of a power line communication, PLC, is effected via two welding current lines 3-1, 3-2 of the same potential. As shown in FIG. 2, the two first current lines 3-1, 3-2 are at a positive electric potential (+) and the two remaining electric current lines 3-3, 3-4 are at a negative electric potential (−). In the exemplified embodiment illustrated in FIG. 2, a first current-compensated choke 5 is provided at the first end of the power transfer cable 3, and a second current-compensated choke 7 is provided at the second end of the power transfer cable 3. The first current-compensated choke 5 has two windings 5A, 5B, wherein the first winding 5A is provided on the second current line 3-2 and the second winding 5B is provided on the third current line 3-3. In the same way, the second choke 7 attached to the other end of the power transfer cable 3 has a first winding 7A and a second winding 7B. The first winding 7A of the second choke 7 is provided on the second current line 3-2 and the second winding 7B of the second choke 7 is provided on the third current line 3-3 of the power transfer cable 3. The two chokes 5, 7 therefore compensate for the magnetic fields which arise owing to the power transfer current, in particular a welding current, flowing back and forth. Shorting of the user data signal is prevented by the current-compensated chokes 5, 7. The chokes 5, 7 block the HF signal. The use of the current-compensated chokes 5, 7 also does not impair the power transfer and/or the welding process.

FIG. 3 shows a further embodiment variant of the power transmission system 1 in accordance with the invention, in which both pole pairs are compensated for. The embodiment illustrated in FIG. 3 is characterised by its symmetrical construction. In this case, the number of current lines determines the number of current-compensated chokes. Accordingly, in the exemplified embodiment illustrated in FIG. 3, the choke 5 consists of two chokes 5-1 and 5-2 disposed on the side of the power source LQ and the choke 7 consists of two chokes 7-1 and 7-2 disposed on the side of the power sink LS. The chokes 5-1, 5-2, 7-1 and 7-2 are indicated in a corresponding manner by means of the illustrated ferrite cores. As a result, a winding is disposed at each end of the current line. In both embodiment variants illustrated in FIGS. 2 and 3, user data can be transmitted between the welding device 2 and the wire feed device with the aid of the two user data modems 2C, 4C. In this way, it is possible, during the power transfer or as the welding current is flowing, to simultaneously transmit a user data signal from the welding device 2 to the wire feed device or vice versa from the wire feed device back to the welding device 2. In so doing, useful signals in a broadband frequency range, BBFB, of preferably 2 to 30 MHz are transmitted unidirectionally or bidirectionally or in a half-duplex or full-duplex manner. In one possible embodiment, the user data frequency range provided is divided into underfrequency bands which can be selectively used as data transmission channels. In this way it is possible to serially transmit different process parameters, PP, for control of the welding process via the power transfer cable 3. Furthermore, in other data transmission channels or frequency bands, sensor data, SD, which can be obtained at the welding torch via sensors, can be transmitted to the controller 2B of the welding device 2 in order to provide feedback on the progress of the welding process. Therefore, during the ongoing welding process it is possible to transmit control signals or welding parameter settings from the welding device 2 to the wire feed device 4. In one possible embodiment, the data communication or data transmission takes place bidirectionally so that, during the transmission of the control data from the welding device 2 to the welding torch 4, different sensor signals or sensor data, SD, can be transmitted to the controller 2B. The transmitted user data are not interfered with or impaired by the welding current I transmitted at the same time. This is the case especially because the user data are transmitted on homopolar lines with identical interference levels, whereby interference is not visible to the modems. In a corresponding manner, the signal-to-noise ratio is higher by a multiple compared to when the user data are transmitted on non-homopolar lines.

Figure 4:
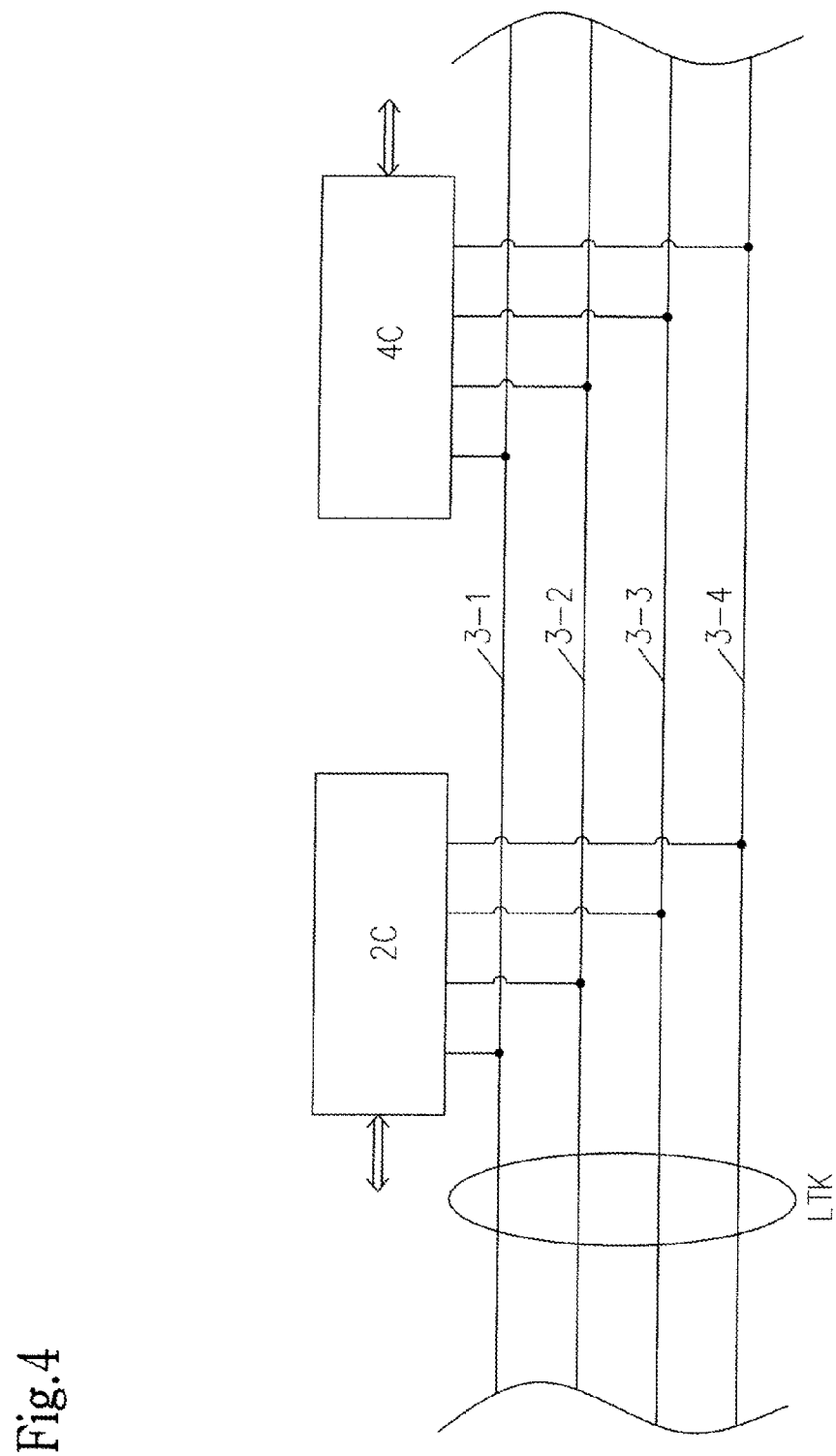
FIG. 4 is a circuit diagram to illustrate a further exemplified embodiment of a power transmission system in accordance with the invention.

FIG. 4 shows a further embodiment variant of the power transmission system 1 in accordance with the invention. In the illustrated exemplified embodiment, the two user data modems 2C, 4C are connected to the two conducting pairs. The two user data modems 2C, 4C are connected to the first conducting pair having the two current lines 3-1, 3-2 and to the second conducting pair having the two current lines 3-3, 3-4. Since, in this embodiment, both conducting pairs can be used for data transmission, the extent of the user data transmitted is increased.

Figure 5:
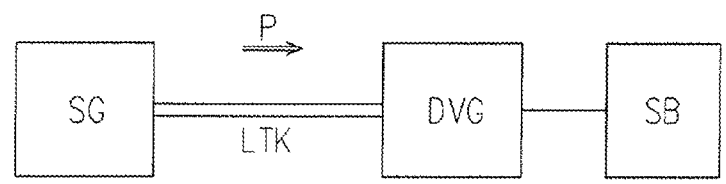
FIGS. 5, 6, 7 illustrate different applications of a power transmission system in accordance with the invention.
Figure 6:
Figure 7:
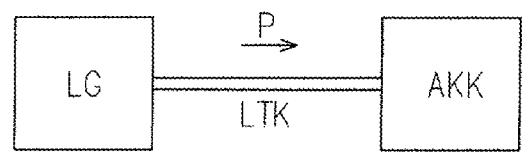

FIGS. 5, 6 and 7 schematically illustrate different exemplified embodiments for the power transmission system 1 in accordance with the invention. In the exemplified embodiment illustrated in FIG. 5, electric power P is transmitted via a power transfer cable, LTK, 3 from a welding device, SG, to a wire feed device DVG, to which a welding torch SB is connected. In one possible embodiment, the power transfer cable 3 has four current lines. The power transfer cable 3 has two conducting pairs each with two current lines which are at the same electric potential. The data transmission of the user data is thus effected during the power transmission via current lines with the same electric potential so that they remain uninfluenced during the power transmission.

FIG. 6 shows, as a further application as a power source, a photovoltaic module PVM, which is connected to a connection component AK in the power source, wherein the connection component AK is connected via a power transfer cable, LTK, 3 to an inverter WR of the photovoltaic system PVM. The photovoltaic module PVM transmits electric power P via the power transfer cable 3 to the inverter WR which can convert the received direct current into an alternative current.

FIG. 7 shows, as a further application, the power transmission from a charging device LG as a power source to an accumulator AKK as a power sink via a power transfer cable, LTK, 3. In all applications, as schematically illustrated in FIGS. 5, 6 and 7, the two devices connected to one another via the power transfer cable 3 can communicate with one another unidirectionally or bidirectionally during the power transfer of the electric power P. In this case, "bidirectionally" includes both full duplex and also half duplex. In the power transfer cable 3 in accordance with the invention, two conducting pairs are preferably provided with two current lines in each case. In alternative embodiments of the power transfer cable 3 in accordance with the invention, further conducting pairs can also be provided. Each conducting pair consists of two current transmission lines which are both at the same electric potential during the power transfer. In one possible embodiment of the power transfer cable 3 in accordance with the invention, at both ends of the power transfer cable 3, data connections for connection of a user data modem 2C, 4C are provided. In a further possible embodiment of the power transfer cable 3 in accordance with the invention, the two user data modems 2C, 4C can also be integrated at the ends of the power transfer cable 3 and connected via a user data interface to a device which has a power source and/or a power sink. In this embodiment, the power transfer cable 3 has a current interface for connection to the power source and/or power sink of the device and has a data interface for connection to a control unit of the respective device. The power transfer cable 3 preferably has a protective casing which contains the various conducting pairs.

The protective casing of the power transfer cable 3 can additionally preferably be screened.

The invention claimed is:

1. A power transmission system for power transmission of electric power from a power source to a power sink via a power transfer cable,
   wherein the power source and the power sink each comprise a first pole with a first electric potential and a second pole with a second electric potential, wherein the first poles are connected via parallel current lines of a first conducting pair from a first current line and a second current line, and
   wherein, during the power transmission via the current lines, a user data signal can be transmitted between the power source and the power sink via at least one conducting pair with current lines of the same electric potential, characterised in that
   wherein the second poles are connected via parallel current lines of a second conducting pair from a third current line and a fourth current line, wherein at a first end of the power transfer cable a first current-compensated choke with a first winding and a second winding is provided for decoupling purposes and
   wherein at a second end of the power transfer cable a second current-compensated choke with a first winding and a second winding is provided for decoupling purposes,
   wherein the first winding of the first choke and the first winding of the second choke are provided on the second current line and
   wherein the second winding of the first choke and the second winding of the second choke are provided on the third current line of the power transfer cable.

2. The power transmission system as claimed in claim 1, wherein the power transfer cable comprises, both on the side of the power source and also on the side of the power sink, a user data modem which is attached or can be connected to the current lines, which modem is provided to send and/or receive a user data signal in a preset user data frequency band.

3. The power transmission system as claimed in claim 2, wherein the user data frequency band for the user data signal transmitted via the current lines of the same electric potential is in a frequency range of 2 MHz to 30 MHz.

4. The power transmission system as claimed in claim 2, wherein the user data modems are connected to a controller in order to transmit a user data signal.

5. The power transmission system as claimed in claim 1, wherein the first pole of the power source, which has a first electric potential, is connected via a first bifurcation point (GP1) provided at the first end of the power transfer cable (3) to the first current line of the power transfer cable and to the second current line of the power transfer cable which are both connected via a second bifurcation point provided at the second end of the power transfer cable to the first pole of the power sink, and wherein the second pole of the power source, which has a second electric potential, is connected via a third bifurcation point provided at the first end of the power transfer cable to the third current line of the power transfer cable and to the fourth current line of the power transfer cable which are both connected via a fourth bifurcation point provided at the second end of the power transfer cable to the second pole of the power sink.

6. The power transmission system as claimed in claim 1, wherein the current lines of the power transfer cable are arranged in each case to transmit electric power of at least 1 KW.

7. The power transmission system as claimed in claim 1, wherein the power source is a welding current source of a welding device, which transmits a welding current to a wire feed device as a power sink via the current lines of the power transfer cable.

8. The power transmission system as claimed in claim 1, wherein the power source is a photovoltaic module of a photovoltaic system, which transmits an electric direct current to an inverter of the photovoltaic system via the current lines of the power transfer cable.

9. The power transmission system as claimed in claim 1, wherein the power source is a charging device which transmits a charging current to a chargeable accumulator as a power sink via the current lines of the power transfer cable.

10. The power transmission system as claimed in claim 1, having a further current-compensated choke at the first end of the power transfer cable with a first winding which is provided on the first current line and with a second winding which is provided on the fourth current line; and
    having still a further current-compensated choke at the second end of the power transfer cable with a first winding which is provided on the first current line and with a second winding which is provided on the fourth current line.

11. A power transfer cable for transfer of electric power from a power source to a power sink, wherein the power transfer cable comprises at least one first conducting pair with two parallel current lines, namely a first current line and a second current line,
    wherein the two parallel current lines of each conducting pair have the same electric potential during the power transfer and are galvanically connected to one another at both ends of the power transfer cable,
    wherein in at least one conducting pair at both ends of the power transfer cable a respective user data connection for connection of a user data modem is provided which is suitable for sending and/or receiving a user data signal transmitted via the two current lines of the conducting pair,
    wherein the power transfer cable comprises at least one second conducting pair with two parallel current lines, namely a third current line and a fourth current line,
    wherein at a first end of the power transfer cable a first current-compensated choke with a first winding and a second winding is provided for decoupling purposes and
    wherein at a second end of the power transfer cable a second current-compensated choke with a first winding and a second winding is provided for decoupling purposes,
    wherein the first winding of the first choke and the first winding of the second choke are provided on the second current line and
    wherein the second winding of the first choke and the second winding of the second choke are provided on the third current line of the power transfer cable.

12. The power transfer cable as claimed in claim 11, wherein the power source is a welding current source and that the power sink is a welding torch.

* * * * *